INVENTORS
James A. Boyd
Reinhold G. Pflugfelder

ATTYS.

United States Patent Office 3,493,781
Patented Feb. 3, 1970

3,493,781
FET WAVEFORM GENERATOR
James A. Boyd, Phoenix, and Reinhold G. Pflugfelder, Scottsdale, Ariz., assignors to Motorola, Inc., Franklin Park, Ill., a corporation of Illinois
Filed Jan. 23, 1967, Ser. No. 610,939
Int. Cl. G06g 7/28
U.S. Cl. 307—229         9 Claims

ABSTRACT OF THE DISCLOSURE

A pulse generator keys an RC circuit for accurately approximating a complex waveform by joining together two exponentials of different time constants. A pair of FET's and a diode are interconnected in a parallel relationship such that when the diode is conducting the resistance of the total network is used to charge/discharge the capacitor, thus forming the initial time constant. Upon reaching a specified breakpoint voltage the diode stops conducting and immediately the charging/discharging time constant is altered as determined by one of the FET's and its associated circuits. A control voltage is provided in parallel to both FET's such that as the control voltage changes not only does the time constant of the RC circuit change but also the diode breakpoint voltage.

BACKGROUND OF THE INVENTION

This invention relates to waveform generators and particularly to an RC type of waveform generator using FET's as voltage controllable resistances.

Arcsine $(n/t)$ function versus $t$ voltage waveforms are useful in airborne radar systems to relay corrective course information for navigational purposes. The technique employed is to sample a waveform (the sum of a linear ramp and an arcsine voltage) at points in time determined by a radar echo signal of an operating navigational system. It is important for accurate navigational purposes that the voltage waveform accurately approximates that of a true arcsine function. It is also desirable that the time constants of such waveforms be controllable for simulating different altitudes. A simple RC circuit is not sufficiently accurate to provide a good representation of an arcsine waveform or certain other exponential waveforms nor is it voltage controllable to the degree desired. It is desired that a simple waveform generator be provided that generates a waveform having a much greater resemblance to a waveform representing a selected mathematical function.

SUMMARY OF THE INVENTION

It is an object of this invention to provide a simple waveform generator using solid state devices for accurately approximating certain waveshapes representative of a mathematical function.

It is another object in conjunction with the preceding object to make an accurate voltage controllable waveform generator.

An apparatus embodying the present invention features a voltage controllable resistor network for selectively altering RC time constants to generate a waveform. The controllable network includes a plurality of FET's connected to a common control voltage. A diode is connected between one FET and the capacitor and is switched between conductance and non-conductance to form two portions of the wave being generated. When the control voltage is changed not only is the effective resistance of the circuit changed, but also the voltage at which the diode switches between conductance and non-conductance changes, such voltage being the breakpoint voltage.

A rectangular pulse generator, such as a monostable multivibrator, repetitively charges a capacitor connected to the voltage-controllable resistance network including the FET's and the diode (hereafter termed a breakpoint diode). During one portion of waveform generation the resistance of the entire network, for example, is combined with the capacitance to determine a first time constant for providing a first portion of a wave. When the breakpoint voltage is reached the diode conductivity changes which, for example, switches one FET and its associated circuits out of the circuit, forming a second time constant for generating a second portion of the waveform.

DESCRIPTION OF AN ILLUSTRATIVE EMBODIMENT

Figure 1:
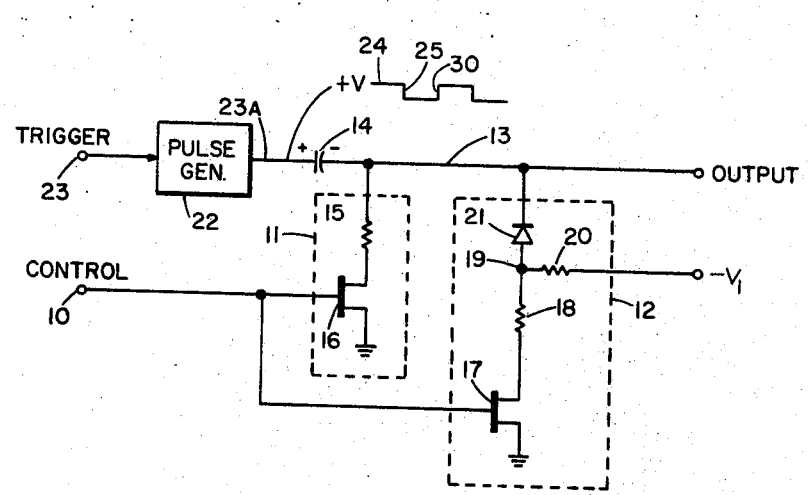
FIG. 1 is a simplified schematic diagram showing an embodiment of the present invention together with a typical waveform for driving a waveform generation capacitor.

FIG. 1 illustrates in schematic diagram form a voltage controllable resistance circuit or resistor for generating two exponentials of different time constants which may, for example, provide an accurate approximation of an arcsine voltage waveform. A control voltage is applied via terminal 10 to a pair of voltage controllable resistance networks 11 and 12 connected as parallel circuits to line 13. A capacitor 14 is used in combination with the networks 11 and 12 to form the voltage waveform by altering the charge-in capacitor 14, the rate of charge being selectively altered as later explained to supply the improved approximation of a mathematical function. Network 11 includes a resistor 15 connected to a first FET transistor 16 having its source electrode grounded and with the gate electrode connected to terminal 10. Voltage controllable resistance network 12 includes a second FET 17 having its gate electrode connected to control terminal 10 and its source electrode grounded, in the same manner as FET 16. The FET 17 drain electrode is connected through resistor 18 to junction 19 which in turn is connected by bias resistor 20 to a $-V_1$ bias voltage, such as $-10$ volts. Diode 21 has its anode connected to junction 19 and its cathode connected to line 13.

The waveform generation circuit operation is initiated by pulse generator 22 upon receipt of a trigger pulse on terminal 23. Pulse generator 22 may consist of a monostable multivibrator which in its normal state supplies a positive voltage to line 23A, such as at 24. Upon receipt of a trigger pulse on terminal 23, generator 22 quickly supplies a zero voltage on line 23A, as indicated by the negative going transient 25. Negative transient 25 causes a negative voltage to be held on line 13 by the capacitance of capacitor 14, it having been charged by generator 22 supplying the positive voltage at 24 on line 23A.

Figure 2:
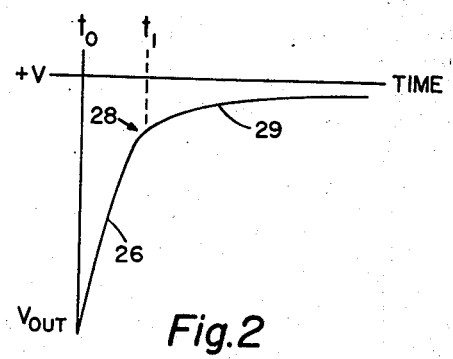
FIG. 2 is a graph showing a typical waveform generated by the FIG. 1 embodiment.

With a negative voltage on line 13 both FET's 16 and 17 operating in a non-saturated mode permit current to flow respectively through the networks 11 and 12 to line 13 to exponentially discharge capacitor 14 making the line 13 voltage less negative according to a first time constant as indicated in FIG. 2 by portion 26 of waveform 28. In the graph in FIG. 2 time $t_0$ corresponds to the time when negative going transient 25 is provided by generator 22. At time $t_1$, the breakpoint in wave 28, the voltage on line 13 has been made sufficiently less negative such that diode 21 is reverse biased and therefore switches to a current non-conduction state. This action quickly isolates network 12 from line 13 and thereby changes the RC time constant from that first provided by the capacitor 14 capacitance and the effective resistance of parallel networks 11 and 12 to that provided by capacitance of capacitor 14 and the effective resistance of only network 11 to then produce portion 29 of waveform 28 (FIG. 2).

The control voltage of terminal 10 is applied in parallel to both FET transistors 16 and 17 to simultaneously adjust their conductivities and thereby the effective resistances of networks 11 and 12. Because of the adjustment in conductivity or resistance of FET 17, the voltage divider network between $-V_1$ and ground reference potential consisting of resistors 18 and 20 and the resistance of FET 17 is changed to alter the voltage at junction 19. The alteration of such voltage shifts the breakpoint voltage of diode 21 and thereby alters time $t_1$ (FIG. 2).

An accurate approximation of an arcsine function was obtained in one embodiment of this invention using the FIG. 1 circuit with a non-linearizing network; for example, the FET's 16 and 17 were type 2N3277; resistor 15 was 56 kilohms; resistor 18, 2.7 kilohms; resistor 20 over one megohm and the capacitance of capacitor 14 was approximately 60 picofarads. The function represented was $$\sin^{-1}\left(\frac{n}{t}\right) \text{ vs. } t$$

where $n$ is an adjustable constant and $t$ time. The non-linearizing network compensated for non-linearities in the 2N3277 transistors to make the circuit respond linearly to a change in control voltage.

Any positive voltage on line 13 is clamped to the terminal 10 control voltage by the drain-to-gate diode action of FET 16 through its drain connected resistor 15. Because of such action the positive going transient 30 from generator 22 is ineffective to initiate generation of an exponential wave with the FIG. 1 circuit arrangement.

Alteration of terminal 10 control voltage simultaneously alters the bias on diode 21 as supplied at junction 19 and the resistance of resistance networks 11 and 12. The control of these two variables by a single control voltage enables a designer to simply and accurately approximate a family of ideal waveforms, representing a single function.

FET's 16 and 17 have a non-linear resistance characteristic with respect to the gate control voltage as supplied over terminal 10. Therefore, as used in the above described test of the illustrative embodiment, it is usually desired to have a non-linearizing network to compensate for the non-linear characteristics of the FET's. Non-linearizing networks of known design may be used and will not be further described.

Other than arcsine waveforms can be formed with a voltage controllable resistance network as described herein. Such other wave generating applications include hyperbolic functions, logarithmic, hyperbolic cotangent, hyperbolic cosecant, as well as other waveforms.

We claim:

1. A waveform generator comprising
 a pulse generator including a monostable multivibrator,
 a capacitor,
 means for charging said capacitor comprising a connection between said pulse generator and said capacitor,
 means for discharging said capacitor,
 said means for discharging said capacitor comprising first and second controllable resistance networks each of which includes an electrically controllable resistance element and each being connected to the capacitance means,
 breakpoint means in said second network electrically interposed between the capacitance means and said second network element and switchable between current conduction and non-conduction states at a given breakpoint voltage, and
 said second network including additional resistance means connected to said breakpoint means at said second network element connection for determining in conjunction with said second network element a voltage at which said breakpoint means switches states such that electrically controlled resistance changes in said second network element simultaneously alters the effective resistance of said second network and said voltage.

2. The waveform generator improvements of claim 1 further including a control voltage terminal connected to both said first and second network electrically controllable resistance elements for simultaneously controlling the resistances thereof, and said breakpoint voltage.

3. A waveform generator having capacitance means capable of having its rate of charge selectively altered and a generator means for selectively initiating an exponential charge alteration in the capacitance means,
 the improvement including in combination,
 first and second controllable resistance networks each of which includes an electrically controllable resistance element and each being connected to the capacitance means,
 breakpoint means in said second network electrically interposed between the capacitance means and said second network element and switchable between current conduction and non-conduction states at a given breakpoint voltage,
 said second network including additional resistance means connected to said breakpoint means at said second network element connection for determining in conjunction with said second network element a voltage at which said breakpoint means switches states such that electrically controlled resistance changes in said second network element simultaneously alters the effective resistance of said second network and said voltage,
 said electrically controlled resistance elements consisting of closely similar field-effect transistor elements having respectively source, gate and drain electrodes, with the source electrodes being connected to a common reference potential, said gate electrodes being connected together and to a control voltage terminal and with respective drain electrodes being connected into said resistance networks respectively,
 and said breakpoint means comprising a semiconductor unit connected to conduct current in one direction between said second resistance network and said capacitance means.

4. The waveform generator improvements of claim 3 wherein said first resistance network comprises a resistor connected in series circuit with said field-effect transistor in said first network and the capacitance means,
 said second controllable resistance network having a breakpoint voltage junction and said semiconductor unit is a diode having a cathode connected to said capacitance means and to said first network resistor and having an anode connected to a breakpoint voltage junction,
 a second resistor connected between said junction and said field-effect transistor drain electrode,
 and an additional bias resistor means connected to said junction for determining said breakpoint voltage in conjunction with the effective resistance of said field-effect transistor and said second resistor.

5. The waveform generator improvements of claim 4 wherein the generator means is a pulse generating means connected to said capacitance means for selectively rapidly providing a current flow initiating voltage to said first and second resistance networks through said capacitance means.

6. The improvement in a waveform generator of claim 5 wherein said pulse generator is a monostable multivibrator.

7. A waveform generator having a capacitor capable of storing an alterable electric charge for selectively generating an exponential electrical wave and means for initiating such generation,
 the improvement including in combination,
 a first voltage controllable resistance means including a field-effect transistor and a resistor connected in series and connected to the capacitor for forming a time constant therewith, a second voltage controllable resistance means including a field-effect transistor and a resistor forming a series circuit and having a diode connected to said series circuit and to the capacitor for forming a time constant therewith, resistor bias means connected to said diode at said series circuit connection for establishing a breakpoint voltage level at which said diode switches between current conduction and non-conduction states, control means connected to said transistors for controlling the conductance thereof whereby the resistance of the networks and said voltage level are simultaneously selectively altered, and the initiation means causing a signal in said capacitance means for biasing said diode into a given conductance state and said networks altering the electric charge according to a first time constant and when said breakpoint voltage level is reached said diode switches between current condition and non-conduction states such that said electric charge is then altered by said networks according to a second time constant.

8. The improvement in a waveform generator of claim 7 wherein the initiation means comprises a monostable multi-vibrator supplying a negative going transient to said capacitor for selectively providing a relatively negative voltage for causing current conduction from said resistance networks to said capacitor for discharging same toward ground reference potential.

9. The improvement in a waveform generator of claim 8 wherein said field-effect transistors each have a source electrode connected to a reference potential, a gate electrode connected to said control means and drain electrodes respectively connected to said resistors in said networks.

References Cited

UNITED STATES PATENTS

| | | | |
|---|---|---|---|
| 1,559,325 | 10/1925 | Jewett | 328—14 |
| 2,216,454 | 10/1940 | Pfister | 328—145 |
| 2,567,691 | 9/1951 | Bock et al. | 328—142 |
| 2,810,107 | 10/1957 | Sauber | 328—142 |
| 3,109,103 | 10/1963 | Wilhelmsen | 328—145 |
| 3,128,377 | 4/1964 | Goddard | 328—145 |
| 3,308,388 | 3/1967 | Genke et al. | 307—237 |
| 3,364,366 | 1/1968 | Dryden | 307—229 |

JOHN S. HEYMAN, Primary Examiner

HAROLD A. DIXON, Assistant Examiner

U.S. Cl. X.R.

307—268, 304; 328—142